March 8, 1949. G. A. BRYANT 2,464,021
VEHICLE ANCHORING MEANS
Filed Jan. 30, 1947 2 Sheets-Sheet 1
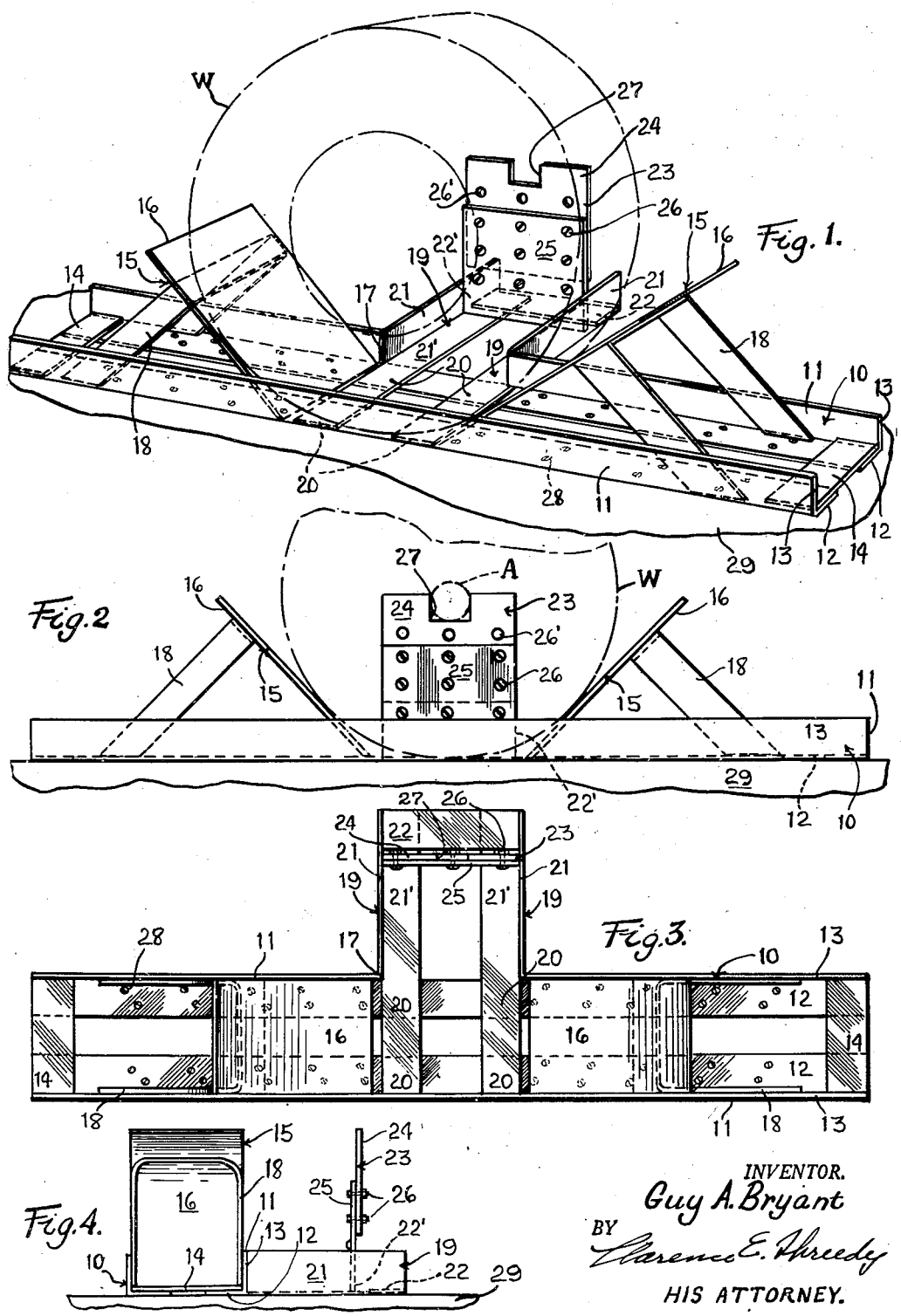
INVENTOR.
Guy A. Bryant
BY Clarence E. Threedy
HIS ATTORNEY.

March 8, 1949. G. A. BRYANT 2,464,021
VEHICLE ANCHORING MEANS
Filed Jan. 30, 1947 2 Sheets-Sheet 2

INVENTOR.
Guy A. Bryant
BY Clarence E. Threedy
HIS ATTORNEY.

Patented Mar. 8, 1949

2,464,021

UNITED STATES PATENT OFFICE 2,464,021

VEHICLE ANCHORING MEANS

Guy A. Bryant, Chicago, Ill.

Application January 30, 1947, Serial No. 725,373

3 Claims. (Cl. 248—119)

This invention relates to vehicle anchoring means for blocking and securing an automobile or other vehicle within and to the floor of a freight car, truck, or the like, during shipment of the automobile or other vehicle in said freight car, truck, or the like.

In transporting automobiles and other vehicles in freight cars, or other transporting vehicles, it is essentially necessary to properly block and secure the automobile to the floor of the freight car to prevent movement of the automobile or the shifting of the same within the freight car. To this end, it is an object of the invention to provide a combination wheel and axle block and support, which is adapted to be securely fixed in a suitable manner to the floor of the freight car for blocking movement of the wheel and for supporting the axle of the automobile while in transit.

Another object of the invention is to provide a structure of the class, and for the purpose, hereinafter described, which will require the minimum degree of labor for mounting the wheel in the wheel block, and the axle upon the axle support, and for attaching the structure to the floor of the freight car.

Another object of the invention is to provide a combination wheel block and axle support in which the axle support is capable of adjustment to compensate for variation in distances between the axle and the floor.

Another and equally important object of this invention is to provide a device of the character hereinafter described which is compact, comprises the minimum number of parts, is simple in construction, economical in manufacture and highly efficient in use.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a perspective view of the invention;

Fig. 2 is a side view of the same;

Fig. 3 is a top plan view of the same;

Fig. 4 is an end view of the same;

Figure 5:
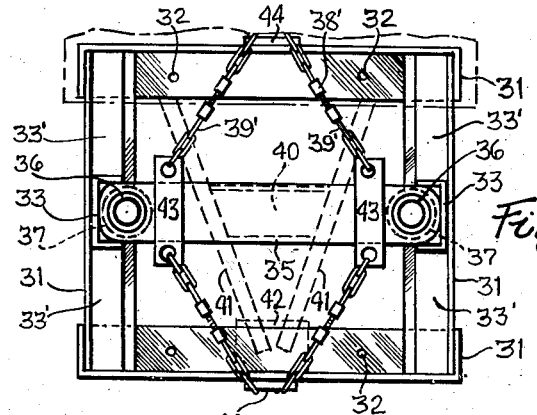
Fig. 5 is a plan view of a tow arm blocking structure and support therefor.

The several objects of my invention are accomplished by the preferred form of construction shown in the accompanying drawings and in which the device comprises a base structure 10, including oppositely disposed parallelly extending side bars 11, formed to provide bottom flanges 12 and upstanding flanges 13. These side bars 11 are spaced from each other and tied together by means of tie-plates 14 arranged at the opposite ends of the side bars 11 and secured thereto by welding or the like.

A wheel saddle is indicated at 15 and comprises confronting plates 16 disposed between the side bars 11 and inclining upwardly in opposite directions with respect to each other, with lower end portions secured to the side bars 11 by welding or the like. These saddle plates 16 are supported in their respective inclined positions, as shown in Fig. 1, by suitable braces 18 secured to the plate 16 and to the side bars 11 by welding or the like. These braces 18, in the present instance, are shown as each being formed of a length of material bent substantially U-shaped, with the medial portion thereof secured to its respective plate 16.

However, if desired, the braces 18 may be formed as a continuation of the plate 16 and secured to the side bars 11 in the manner hereinbefore stated.

One of the side bars 11 has a medial portion thereof cut away, as indicated at 17. Extending transversely of the base 10, through this medial cut away portion 17 of this one side bar 11, are parallel plates 19, having their end portions 20 welded to the bottom plates 12. These plates 19 extend laterally from the adjacent side bar 11 and the outer extending portions thereof provide upstanding flanges 21 and base flanges 21'. The outer end portions of the plates 19 are connected, in spaced relation with respect to each other, by means of a tie-plate 22 welded to the plate 19 in a manner well known in the art.

Positioned between the flanges 21, with its lower end portion 22' secured to the plates 19 and the flanges 21' by welding or the like, is an axle blocking structure 23. This structure 23 comprises complementary plates 24 and 25 adjustably connected together. This adjustable connection may be accomplished by providing in the plates 24 and 25 a plurality of openings 26' for the projection of nut receiving bolts 26 when the plates have been adjusted to a predetermined position with respect to each other. The plate 24 is provided with an axle slot 27 providing a seat for an axle A, carrying the wheel W.

In the plates 12 are provided a plurality of openings 28 through which are adapted to be projected connecting elements in the form of bolts for connecting the base 10 to the floor 29 of the freight car or other transporting vehicle.

Figure 6:
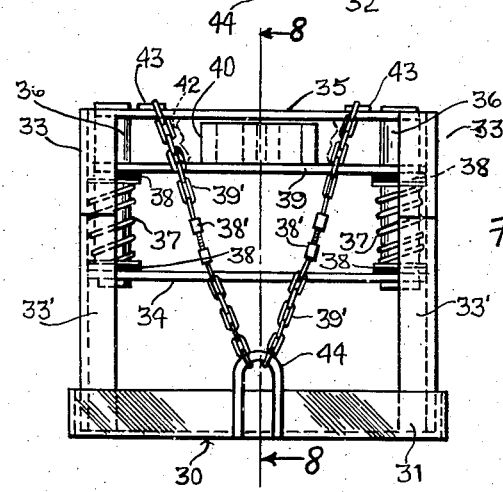
Fig. 6 is a side elevational view of the same.
Figure 7:
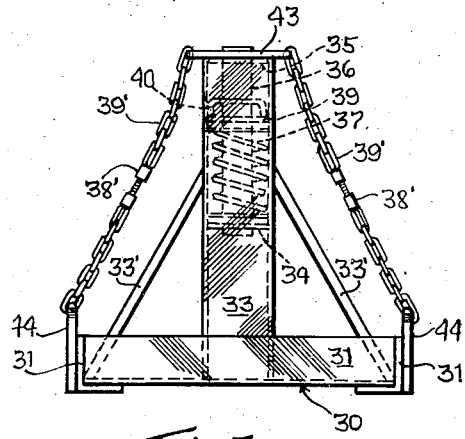
Fig. 7 is an end elevational view of the same.
Figure 8:
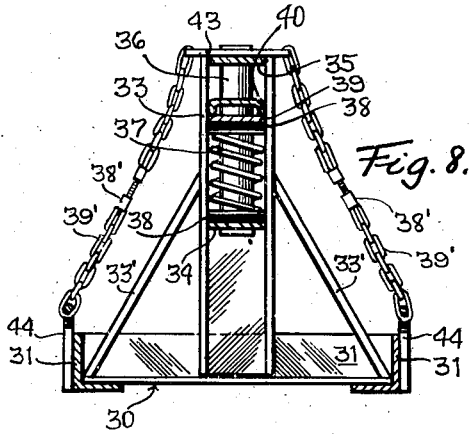
Fig. 8 is a sectional detail view of the same taken substantially on line 8—8 of Fig. 6.

In Figs. 5 to 8 inclusive, I have illustrated a tow arm blocking device. This structure is designed for effectively anchoring the tow arm of a vehicle to the floor of a freight car and has means to compensate for the vibration of the tow arm and to cushion shock which would otherwise be transmitted to the arm.

To accomplish these results, the tow arm blocking device comprises a base 30 substantially rectangular in plan view and made up of bar members 31 secured together by welding or the like, with certain of these bar members provided with openings 32 for attaching the base 30 to the floor 29 of the freight car.

Extending upwardly from this base 30, in confronting relation with respect to each other, are channel-shaped posts 33, supported by suitable braces 33'.

Midway between the top and bottom of these posts 33, and secured thereto by welding or the like, is a transverse plate 34, the ends of the plate 34 projecting into the channels of the posts 33.

Extending between the posts 33 at the top thereof, and slidable with respect to the posts 33 is a tie plate 35, which extends parallel in spaced relation with respect to the plate 34. Carried by and secured to the plate 34 and projecting through openings in the plate 35 and positioned within the channels of the posts 33 are stud shafts 36. Mounted on these shafts 36 are expansion springs 37, the lower and upper end portions of which engage resilient cushioning discs 38. Resting on the upper cushioning discs 38 and having openings formed in opposite ends thereof, through which the posts 33 project, is a mounting plate 39 movable relative to the posts 33 against the action of the springs 37. On this plate 39 is a block 40 adapted to be positioned between the side bars 41 of a tow arm 42.

The tow arm 42 is adapted to be securely clamped between the tie plate 35 and the mounting plate 39. This is accomplished by attaching chains 39' having turnbuckles 38' to perforated cleats 43 and to U-bolts 44.

By this structure, vibration of the tow arm 42 is arrested by the springs 37 and any unusual or severe shock is cushioned and absorbed by these springs 37.

In employing my improved blocking device, the first operation is to jack the wheel sufficiently high above the floor so that the blocking device may be shifted to a position where, upon lowering the wheel, the wheel will snugly fit into the saddle 15. In this operation of positioning the wheel in the saddle 15, the plate 24 has been previously lowered so that when the blocking device is snugly positioned beneath the wheel, the plate 24 may be adjusted relative to the plate 25 to position the axle A in the seat provided by the slot 27. With the device in this position, it will be seen that the wheel is positioned between the upstanding flanges 13, which flanges 13 block any sidewise movement of the automobile. If the automobile has a tow arm, the tow arm is positioned so that the forward end thereof will embrace the block 40.

The wheel and axle blocking device and tow arm block and anchoring structure, after they have been properly positioned, are then securely connected to the floor 29 of the freight car by bolts or other connecting elements, the holes 28 and 32 being provided for such accomplishment.

From the foregoing description, it will be seen that I have provided a blocking device which is compact, comprises the minimum of parts, is capable of installation with the minimum degree of effort and will be highly efficient in use for its intended purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope if the appended claims.

Having thus described my invention, what I claim as new and desire to protect by Letters Patent is:

1. A structure for the purposes herein described comprising a base of elongated formation and including parallelly disposed spaced bars and tie-plates connecting the bars in spaced relation with respect to each other, a saddle on said base between said bars and into which a wheel of an automobile or the like is adapted to be seated, a structure offset laterally from the base and providing a seat for an axle on which said wheel is mounted.

2. A structure for the purposes herein described comprising a base, a saddle on said base into which a wheel of an automobile or the like is adapted to be seated, a structure offset laterally from the base and providing a seat for an axle on which said wheel is mounted, said seat comprising two plates arranged in facial abutment with respect to each other and having means for adjustably connecting said plates together.

3. A structure for the purposes herein described comprising a base of elongated formation and including parallelly disposed spaced bars and tie-plates connecting the bars in spaced relation with respect to each other and providing base flanges and flanges extending vertically from the base flanges, a saddle on said base into which a wheel of an automobile is adapted to be seated and comprising two confronting plate members extending upwardly from the base in diverging directions with respect to each other and having connection adjacent their upper end portions with the base member by a bracing structure.

GUY A. BRYANT.

REFERENCES CITED

The following references are of record in the file of this patent:

UNITED STATES PATENTS

| Number | Name | Date |
| --- | --- | --- |
| 1,254,920 | Mathias | Jan. 29, 1918 |
| 1,336,593 | Sifleet | Apr. 13, 1920 |
| 1,794,321 | Rebuck | Feb. 24, 1931 |